(12) United States Patent
Reunamäki et al.

(10) Patent No.: US 10,021,512 B2
(45) Date of Patent: Jul. 10, 2018

(54) SWITCHING TO ADVERTISING LOCATOR AFTER CONNECTION ESTABLISHMENT

(71) Applicant: Nokia Technologies Oy, Espoo (FI)

(72) Inventors: Jukka Reunamäki, Tampere (FI); Arto Palin, Viiala (FI); Teemu Ilmari Savolainen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/039,164

(22) PCT Filed: Dec. 9, 2013

(86) PCT No.: PCT/US2013/073906
§ 371 (c)(1),
(2) Date: May 25, 2016

(87) PCT Pub. No.: WO2015/088481
PCT Pub. Date: Jun. 18, 2015

(65) Prior Publication Data
US 2017/0118581 A1    Apr. 27, 2017

(51) Int. Cl.
*H04W 4/00*  (2018.01)
*H04W 4/02*  (2018.01)
*H04L 12/749* (2013.01)

(52) U.S. Cl.
CPC ........... *H04W 4/008* (2013.01); *H04L 45/741* (2013.01); *H04W 4/025* (2013.01)

(58) Field of Classification Search
CPC ..... H04W 4/008; H04W 8/005; H04W 4/025; H04L 45/741

USPC ....................... 455/41.2, 518, 519
See application file for complete search history.

(56) References Cited

U.S. PATENT DOCUMENTS

| | | | |
|---|---|---|---|
| 2003/0217179 A1* | 11/2003 | Famolari ........... | H04L 29/12009 709/245 |
| 2006/0034256 A1* | 2/2006 | Addagatla ............. | H04W 48/16 370/352 |
| 2008/0122609 A1* | 5/2008 | Mannisto ............. | G08B 19/005 340/500 |
| 2011/0105024 A1* | 5/2011 | Palin ..................... | H04W 8/005 455/41.2 |
| 2012/0052802 A1 | 3/2012 | Kasslin et al. | |

(Continued)

OTHER PUBLICATIONS

Nieminen et al. "Transmission of IPV6 packets over Bluetooth Low Energy", Internet Draft, Apr. 2011.*

(Continued)

*Primary Examiner* — Raymond Dean
(74) *Attorney, Agent, or Firm* — Mintz Levin Cohn Ferris Glovsky and Popeo, P.C.

(57) ABSTRACT

Methods and apparatus, including computer program products, are provided for advertising location information. In one aspect there is provided a method. The method may include sending, by a wireless device including a radio transceiver, an information indicating an availability of one or more services at the wireless device; changing, when a connection is established to the radio transceiver at the wireless device, the information to include at least one different location where the one or more indicated services may be accessed; and sending the changed information including the at least one different location. Related apparatus, systems, methods, and articles are also described.

13 Claims, 9 Drawing Sheets

(56) References Cited

U.S. PATENT DOCUMENTS

2012/0151353 A1* 6/2012 Joanny ................ H04L 29/0899
                                                                715/735
2015/0156111 A1* 6/2015 Tsiatsis ................... H04L 61/10
                                                                370/392

OTHER PUBLICATIONS

International Search Report and Written Opinion for corresponding Patent Cooperation Treaty Application No. PCT/US2013/073906, dated Sep. 12, 2014, 9 pages.
Wang et al., "Transmitting IPv6 Packets over Bluetooth Low Energy Based on BlueZ" Advanced Communication Technology (ICACT), 2013, 15th International Conference, IEEE, Jan. 27, 2013, 6 pages.

* cited by examiner

SWITCHING TO ADVERTISING LOCATOR AFTER CONNECTION ESTABLISHMENT

RELATED APPLICATION

This application was originally filed as Patent Cooperation Treaty Application No. PCT/US2013/073906 filed Dec. 9, 2013.

FIELD

The subject matter described herein relates to wireless communications.

BACKGROUND

In Bluetooth Low Energy (BTLE), a BTLE device may scan for another device, which advertises one or more services. The other device may advertise services in accordance with Transmission of IPv6 Packets over BLUETOOTH Low Energy, draft-ietf-6lo-btle-00, J. Nieminen et al., Nov. 7, 2013. This discovery may allow the BTLE device to connect to the other device in order to use the advertised service(s). For example, a BTLE device may scan for services, such as a temperature service, an Internet Protocol version 6 (IPv6) service, and the like, advertised via BTLE by the other device. The BTLE device may then couple to the service(s) at the other BTLE device.

SUMMARY

Methods and apparatus, including computer program products, are provided for advertising location information.

In some example embodiments, there is provided a method. The method may include sending, by a wireless device including a radio transceiver, an information indicating an availability of one or more services at the wireless device; changing, when a connection is established to the radio transceiver at the wireless device, the information to include at least one different location where the one or more indicated services may be accessed; and sending the changed information including the at least one different location.

In some variations, one or more of the features disclosed herein including the following features can optionally be included in any feasible combination. The one or more services may include an Internet Protocol version 6 protocol. The connection may be established as an Internet Protocol version 6 connection. The at least one different location may correspond to an address of at least one of a remote server, a gateway, a connection, and a cache. The at least one different location may correspond to an address where the wireless device is reachable, wherein the address includes at least one of an Internet Protocol address, an Internet Protocol version 4 address, an Internet Protocol version 6 address, a uniform resource locator, and a domain name. The wireless device may include a sensor including a single short-range transceiver. The information and the change information may be broadcast via the short-range radio transceiver. The radio transceiver may be configured in accordance with at least one of Bluetooth Low Energy and Bluetooth. The location of the wireless device may be sent, wherein the location may comprise at least one of an Internet Protocol address, an Internet Protocol version 4 address, and an Internet Protocol version 6 address.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
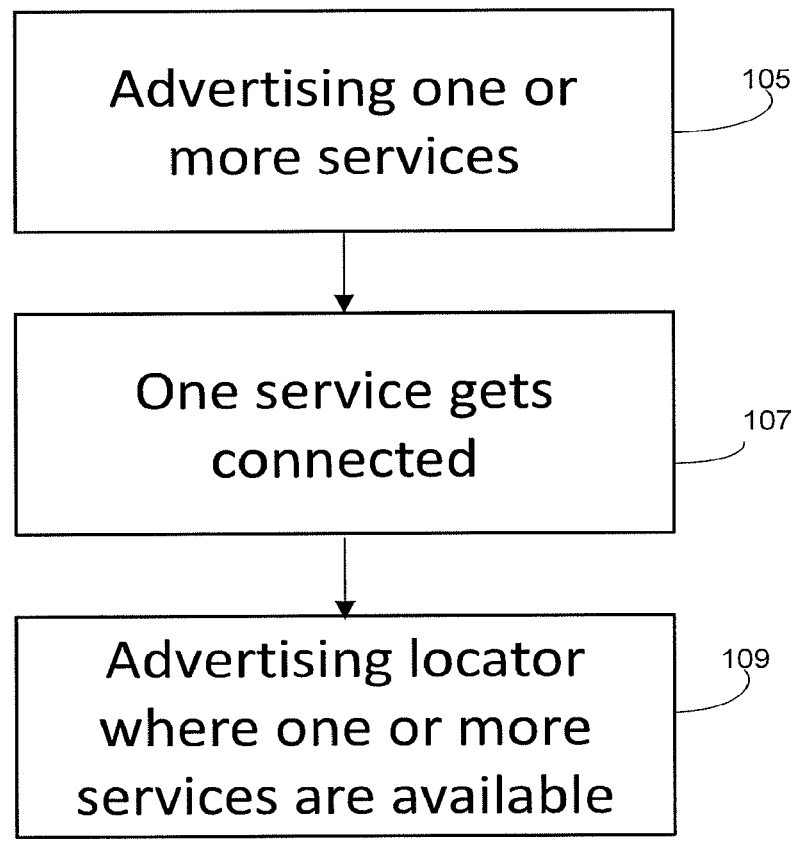
FIG. 1A depicts an example of a process for changing a locator in an advertisement, in accordance with some example embodiments.

Like labels are used to refer to same or similar items in the drawings.

DETAILED DESCRIPTION

A wireless device, such as a Bluetooth Low Energy (BTLE) peripheral, may advertise one or more available services, one of which may be for example an IPv6 service. If the BTLE peripheral includes the IPv6 service, another wireless device may directly access the IPv6 service at the BTLE peripheral, and this other wireless device may remain coupled via the IPv6 service. However, the other wireless device may remain directly coupled to the IPv6 service at the BTLE peripheral virtually indefinitely, in which case no other device is able to connect to the IPv6 service at the BTLE peripheral to access for example the BTLE peripheral's data. This is due to fact that BTLE peripheral may, at any given time, have only one direct, physical connection at the BTLE interface. To illustrate, if the BTLE peripheral is a thermostat having a single BTLE radio interface and IPv6 service support, a single wireless device may couple to the single BTLE radio interface and to the IPv6 service of the thermostat. When this is the case, other devices may not be able to directly couple directly to the thermostat's BTLE radio interface. Nor can other devices couple to the thermostat via IPv6 at the BTLE radio interface. However, in the case where the BTLE peripheral is configured to support multiple devices at the same time with the IPv6 service, the BTLE peripheral may have to maintain multitude parallel connections, which would increase energy consumption and require substantially more memory at the peripheral.

In some example embodiments, a first device, such as a BTLE device, may first advertise one or more services that can be directly accessed, or connected to, via a BTLE radio interface at the first device. When a second device such as another BTLE device connects to the first BTLE device, the first BTLE device may then change the content of the advertisement being broadcast via BTLE to include a locator where the one or more services may instead be reached.

In some example embodiments, a first device, such as a BTLE device and the like, may initially advertise via BTLE support for one or more services, such as an IPv6 service to which a second BTLE device can directly couple to the first BTLE device. The advertised services may also include for example the availability of sensor data, a temperature service, and any other service made available by the first BTLE device. After the second BTLE device connects to a first BTLE device via the BTLE radio interface and IPv6 service (making the first BTLE device unavailable for other direct IPv6 service connections), the first BTLE device may, in some example embodiments, change the content of the BTLE advertisements to specify another locator, such as an address or other type of indication of location where the one or more services of the first BTLE device may be reachable. In this example, when a third BTLE device receives the changed BTLE advertisement including the changed locator, the third BTLE device may couple to a location representative of the changed locator, rather than directly to the BTLE interface advertised in the original (i.e., prior to the change) advertisement.

In some example embodiments, the BTLE peripheral may choose the IPv6 address advertised as it's locator in a way that the BTLE peripheral can differentiate whether incoming requests are coming to the address advertised in BTLE. For example, when the second BTLE device connects to a first BTLE peripheral and the first BLE peripheral obtains IPv6 connectivity via the second BTLE device, the BTLE peripheral may configure two or more IPv6 addresses. One of these addresses may be advertised locally over BTLE, and the other address may be used for other types of communications the BTLE peripheral/sensor intends to use on networks, such as the Internet. As such, the BTLE peripheral/sensor can differentiate requests/messages based on the destination address. For example, a request/message to an address advertised via BTLE versus a request/message to a destination using the BTLE peripheral/sensor's Internet address, allowing for differentiated services.

Although the previous example describes a certain device initiating the connection, the connection may be established by either device (for example, by the sensor or the gateway). In the case of the BTLE sensor, it may be advertising the IPv6 capability, in which case the gateway connects to it, while in the case of the gateway, it may be advertising IPv6 capability, and then sensor connects to the gateway.

Although some of the examples described herein refer to BTLE as the radio technology being used, other short-range and/or low energy radio technologies may be used as well including Bluetooth, ZigBee, ANT, ANT+, Z-Wave, WirelessHART, Wi-Fi, and the like. Furthermore, although some of the examples described herein refer to IPv6 as the service being advertised, other types of services and address types may be used as well.

FIG. 1A depicts an example process 100 for changing a BTLE advertised locator, in accordance with some example embodiments.

At 105, a first BTLE device may advertise services, such as a Generic Attribute Profile (GATT) service, an IPv6 service where a direct connection to the first BTLE device can be established, and the like. For example, the first BTLE device may send (for example, broadcast) an advertisement message indicating the one or more services available via BTLE at the first BTLE device.

Figure 1B:
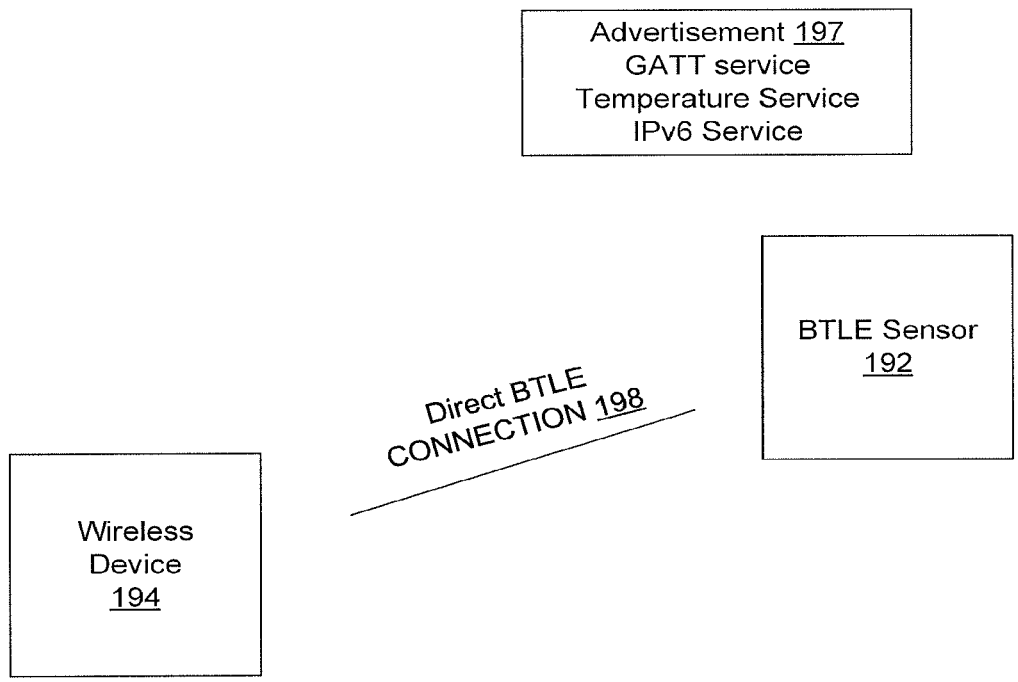
FIGS. 1B and 1C depict examples of systems for changing a locator in an advertisement, in accordance with some example embodiments.

FIG. 1B depicts an example system 100 system including a first BTLE device 192 (which in this example is a BTLE sensor or peripheral) and a second BTLE device 194 (which in this example is a radio or smartphone including a router). The BTLE sensor 192 may include only a single BTLE radio interface having one or more services, such as an IPv6 service.

Referring again to FIG. 1A, BTLE sensor 192 may send, at 105, an advertisement 197, which when received by BTLE device 194 allows BTLE device 194 to directly establish a BTLE connection, at 107, to the BTLE radio interface at BTLE sensor 192 and the service, such as an IPv6 service. For example, BTLE device 194 may establish a BTLE connection at the BTLE radio interface of to BTLE sensor 192.

When BTLE sensor 192 obtains a direct BTLE connection to BTLE device 194, BTLE sensor 192 may then change, at 109, the advertisement to include another locator. This locator may indicate reachability at another locator, such as another address, IPv6 address, domain name, and the like. This other locator may be configured on a connection to the second BTLE device 194. For example, the changed locator being advertised may correspond to an address at the second BTLE device 194 or a corresponding connection where the first BTLE 192 can be reached (for example, at IPv6 address at device 194 that is routed via BTLE connection 198 to BTLE sensor 192). The locator advertised may change while BTLE sensor 192 is connected to second BTLE device 194, without requiring a connection between the devices to be re-established.

Figure 1C:
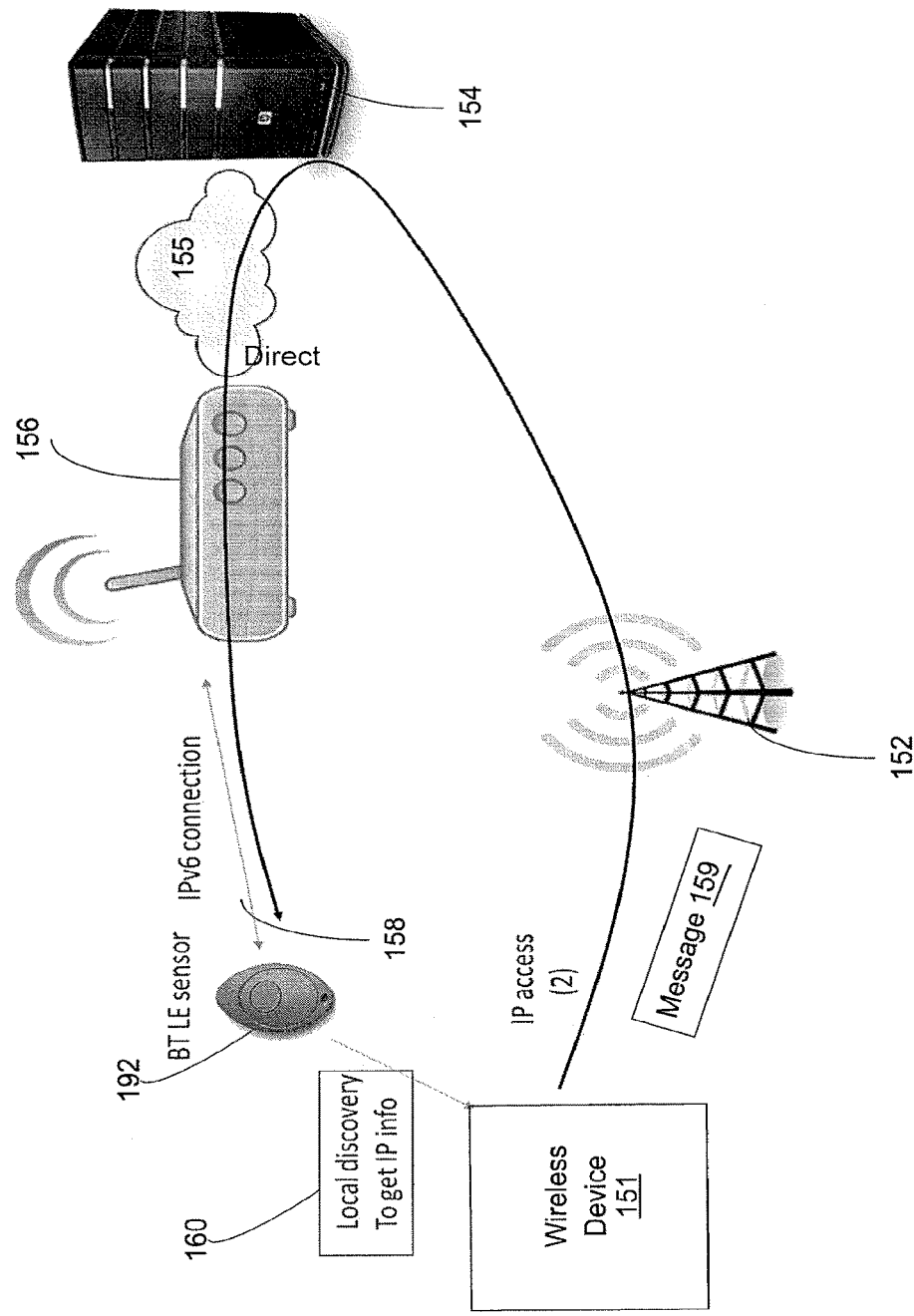

FIG. 1C depicts another example system 150 for changing BTLE advertisements, in accordance with some example embodiments. In the example of FIG. 1C, a first BTLE device 192 may advertise via BTLE one or more services including the availability an IPv6 service. In response to the advertisement, wireless device 156 may establish via BTLE a direct BTLE connection 158 to the BTLE radio interface at BTLE device 192. When the direct BTLE connection is established, BTLE device 192 may advertise at 160 with a changed locator indicating for example an IP address for the connection 158, rather than the BTLE IPv6 service originally advertised. When a third device, such as device 151, receives this advertisement, device 151 communicates with BTLE 192 by using the new locator configured for the connection 158. For example, device 151 may send a message 159 that is routed via wireless access points/base stations 152, networks 155, servers 154, and/or gateway 156, where the message may be routed directly via BTLE connection 158 to BTLE sensor 192. If other devices want to access and/or communication with BTLE device 192, those other devices would also use the locator advertised at 160. In this way, the single BTLE radio interface at device 192 can communicate with a plurality of devices via for example gateway 156 and the single BTLE interface at BTLE sensor 192.

In some example embodiments, the BTLE advertisement 160 may include one or more dedicated unique universal identifiers (UUID) to indicate the one or more locators where the BTLE sensor is reachable.

Figure 2:
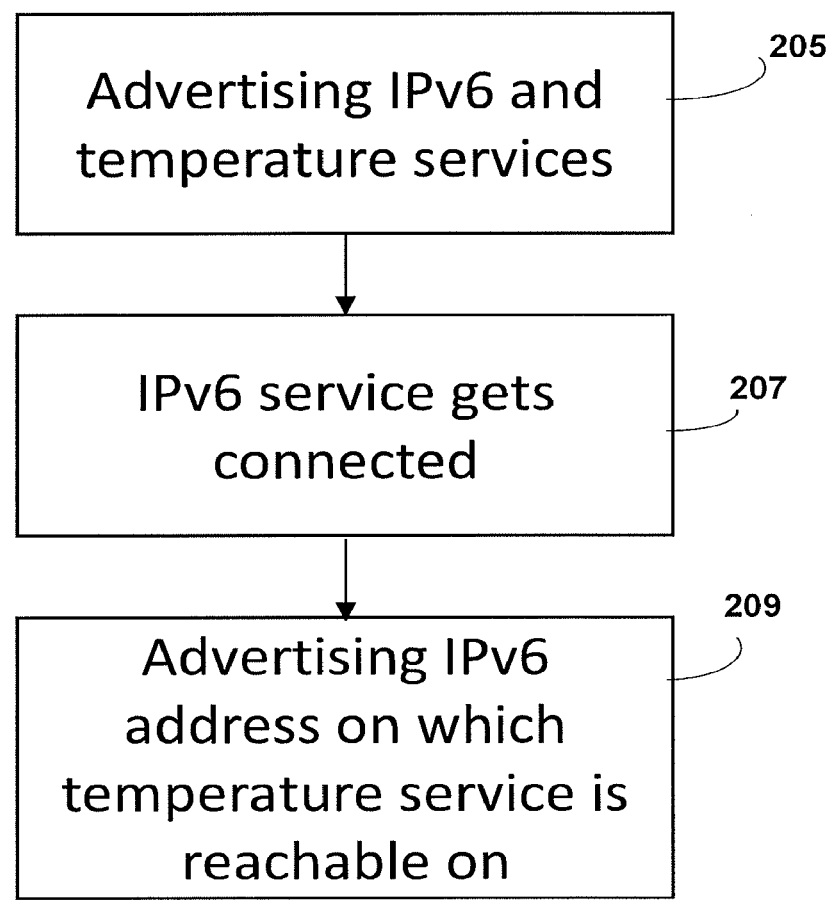
FIG. 2 depicts another example of a process for changing a locator in an advertisement, in accordance with some example embodiments.

FIG. 2 depicts another example process 200 for changing an advertised locator, in accordance with some example embodiments. The description of FIG. 2 also refers to FIG. 1C.

At 205, a first device, such as BTLE sensor 192, may initially advertise itself as connectable to provide one or more services, such as sensor data, a temperature service, and an IPv6 service, and the like. For example, BTLE 192 may be coupled via a BTLE radio interface at BTLE sensor 192 to provide the IPv6 service and provide sensor data, such as temperature data. At 207, when another BTLE device establishes a direct BTLE connection via the BTLE radio interface at device 192, first device 192 may change, at 209, the advertised locator where the one or more services provided by the first device are available or reachable. For example, the advertisement may change from the IPv6 service at the BTLE interface of device 192 to another address on for example another device or a connection. The address of the other device may be the address of a device directly coupled via BTLE (for example, gateway 156 at FIG. 1C), a connection address, such as connection 158, and/or the address of any other device (for example, a remote server 154, a cache, and the like) capable of serving data from cache, providing access, or routing messages to/from BTLE sensor 192.

In some example embodiments, the address or locator included in the changed advertisement sent at for example 109 and 209 by BTLE device 192 may indicate where one or more services may be reached/accessed. This locator may be implemented as one or more of the following: an IPv4 address (for example, 192.0.2.1), an IPv6 address (for example, 2001:db8::1), a fully qualified domain name (for example, sensor.example.com), a hypertext transport protocol uniform resource locator (for example, http://sensor.example.com/value), a constrained application protocol (CoAP) uniform resource locator (for example, coap://sensor.example.com/value), a telephone number (for example, +1 555 5555 to which for example a short message service text can be sent), an email address (for example, sensor@example.com), and a social media account identifier, and/or any other indicator of location, address, and the like.

In some example embodiments, the advertised locator may be extended with additional information, such as protocol information, port information, credentials, authentication information, and the like.

In some example embodiments, the locator may not necessarily point directly to the first BTLE device 192, but may instead indirectly point to the first BTLE device 192 by way of a remote server, a cloud service, a cache, and the like. For example, if BTLE device 192 advertises IPv6 and temperature services and then directly connects with the IPv6 service to a Bluetooth Low Energy gateway 156, BTLE device 192 may then communicate its temperature data to a remote server, cloud service, and the like. The BTLE device 192 may then send Bluetooth Low Energy advertisements that point listeners to communicate with the remote server, cloud service, and the like, in order to access BTLE device 192's data.

Figure 3:
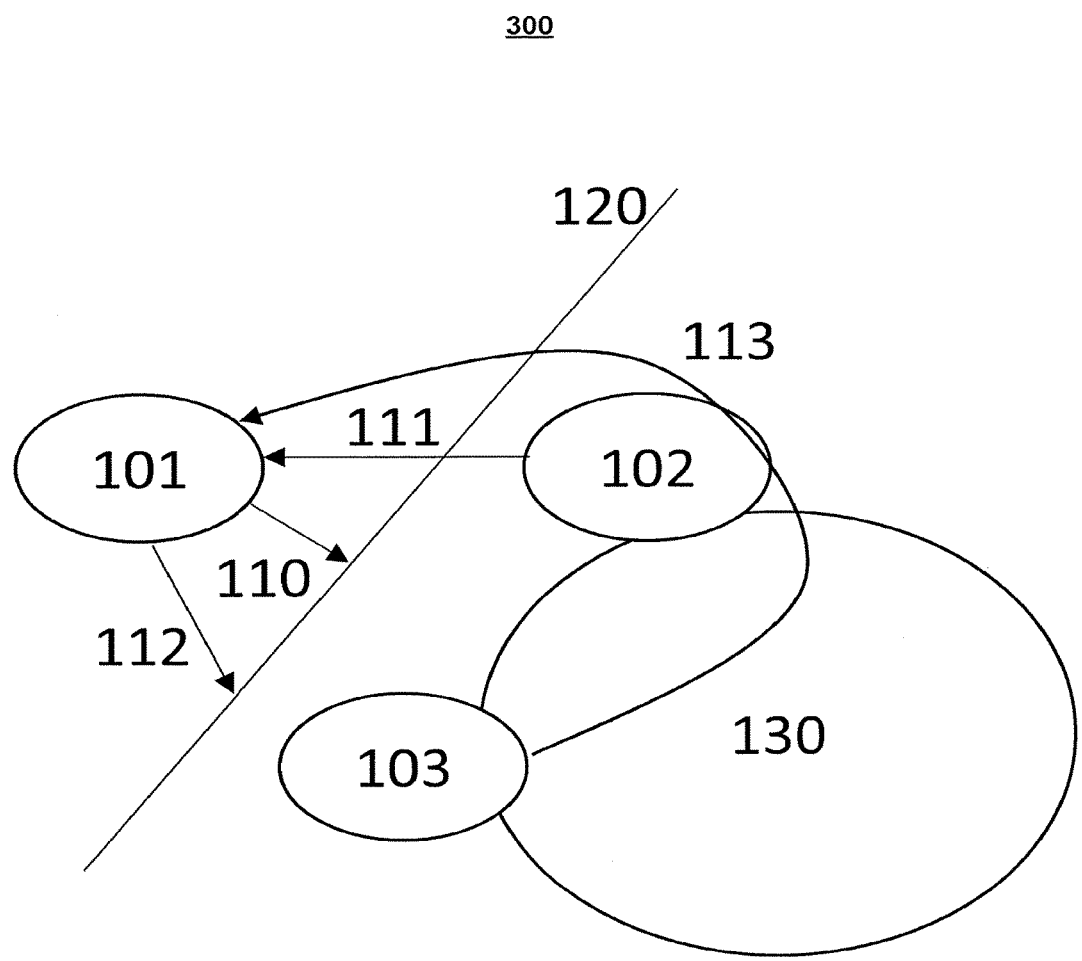
FIGS. 3 and 4 depict additional examples of systems for changing a locator in an advertisement, in accordance with some example embodiments.

FIG. 3 depicts an example system 300 for changing the locator being advertised via BTLE, in accordance with some example embodiments.

The system 300 may include a BTLE device 101 configured to initially advertise its services including IPv6 service and the like. This advertisement may be provided by a broadcast message sent by the BTLE radio interface 120 of BTLE device 101. The BTLE broadcast message (or signal) may be heard by one or more devices, such as BTLE devices 102 and 103. For example, BTLE device 102 may include a router, and may connect to the IPv6 service at BTLE device 101 by sending a message 111. With this process, the BTLE device 102 (which includes a routing function) may provide IPv6 addressing to and/or from BTLE device 101, and may provide connectivity to other networks including for example, Internet 130 and the like.

In some example embodiments, when BTLE device 101 obtains a direct IPv6 connection to BTLE device 102 (which provides IPv6 addressing and network connectivity), BTLE device 101 may change the advertisements being sent/broadcast, so that the advertisement sent via broadcast message 112 via radio interface 120 includes the IPv6 address obtained from BTLE device 102 as its locator. For example, the advertisement may include a locator at an interface at device 102, which routes via BTLE to device 101. To illustrate further, another device, such as third BTLE device 103, may receive the changed advertisement 112 including the changed locator. Rather than attempting to directly connect over BTLE radio interface 120 to the first IPv6 service address advertised at 110 (which would not work as BTLE device 101 is connected to BTLE device 102), the third BTLE device 103 may instead use the changed BLTE locator received at 112 and reach BTLE device 101 by sending message 113 to the changed locator. In the example of FIG. 3, the changed locator represents an IPv6 address at device 102, so device 103 can reach device 101 by sending to the changed locator via Internet 130 and device 102, which routes the message via IPv6 to BTLE radio interface 120 and device 101.

Figure 4:
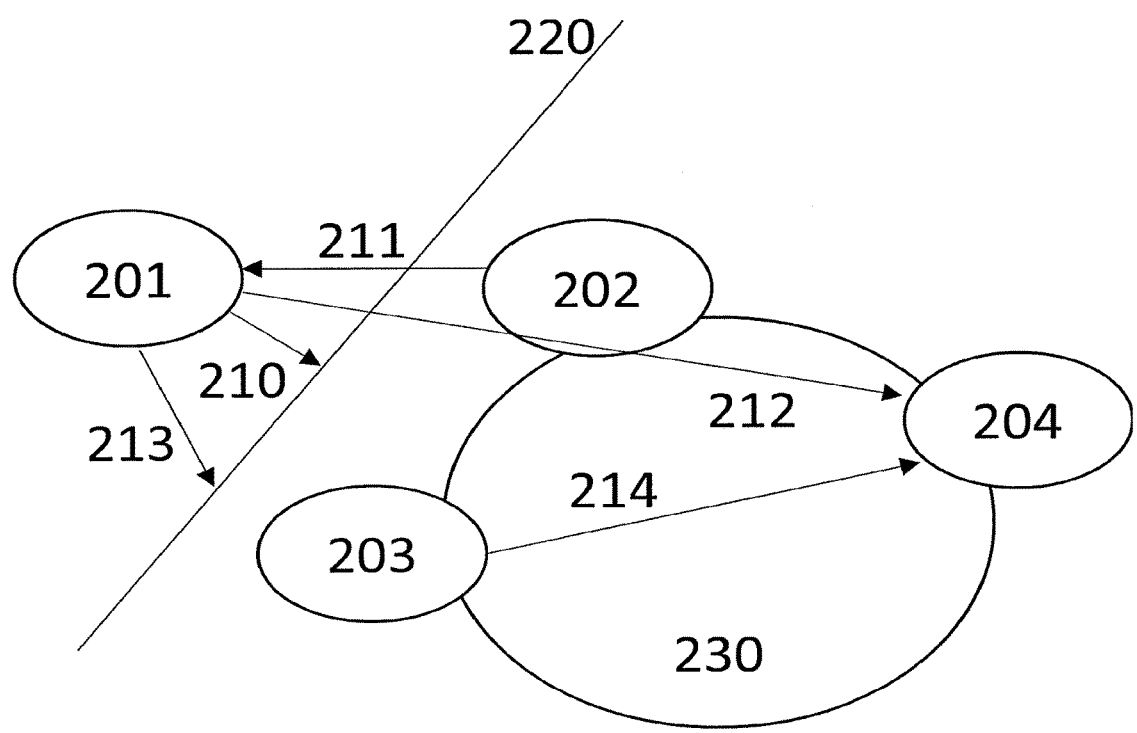

FIG. 4 depicts another example system 400 for changing the locator being advertised via BTLE, in accordance with some example embodiments.

BTLE device 201 may initially advertise its services including IPv6 service via broadcast message sent via BTLE radio interface 220. This message or signal may be received by one or more devices, such as BTLE devices 202 and 203. BTLE device 202 may include a router, and may connect to the IPv6 service at BTLE device 201 via interface 220. With this process, BTLE device 202 including router provides addressing, such as IPv6 addressing, on behalf of BTLE device 201 and network connectivity to for example Internet 230.

BTLE device 201 may initiate communication of data with messaging 212 to for example a remote device, such as remote server 204. The remote server 204 may be implemented as for example a server accessible via a network, such as the Internet and the like. For example, the remote server 204 may be implemented as a cloud service, a hypertext transfer protocol (HTTP) server, a CoAP proxy, and the like.

In some example embodiments, after BTLE device 201 initiates communication with remote server 204, BTLE device 201 may then advertise with broadcast messages 213 over BTLE radio interface 220 a changed locator indicating remote server 204 (which may identify a specific resource or service at server 204), and this changed locator indicates to other devices where for example data of BTLE device 201 may be obtained. For example, remote server 204 might provide to BTLE device 201 what the actual locator for device 201's data, and that locator may then be advertised in message 213. This changed locator in the advertisement may be received by BTLE device 203, in which case, BTLE device 203 may communicate, in accordance with some example embodiments, with remote server 204 as shown by message 214 (which may be sent in accordance with one or more protocols, such as HTTP, CoAP, email, short message service, TCP, UDP, or any other protocol or technology).

Although FIGS. 3 and 4 describe a single message being sent at for example 111 and 211, each of these messages may each comprise a plurality of messages as well.

Figure 7:
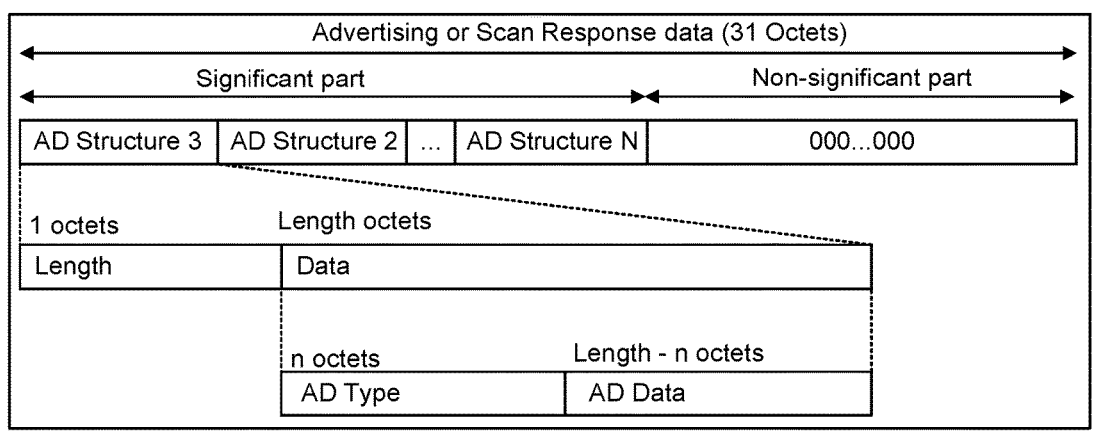
FIG. 7 depicts an table illustrating an example of a format of a Bluetooth Low Energy (BLTE) advertisement.

FIG. 7 depicts a table 700 illustrating an example of a format for the BTLE advertisement. In the example shown in the table 700, the advertisement sent 109 and 209 may include a locator where other devices can access the services of BTLE device 101/201. For example, the AD type field may specify what the data is about and the actual data is send after that. The AD type may be used to indicate IP access information and the data then provides the IPv6 address. For example, the AD type may be 0x1234, which in this example means that the data contains IPv6 data, and that data is found at AD data (for example,aaaa:bbbb:cccc:dddd:eeee:ffff: a1a1:b1b1).

When peripheral device is connected in a Slave Role, the Bluetooth standards may only allow advertisement of services that do not result in a Link Layer entering a Connection State. Therefore, a peripheral may send only either non-connectable undirected advertisements or scannable undirected advertisements. The difference between those two is that the scannable undirected event type may allow a scanner to perform a scan request in order to obtain additional information about the advertiser and thus may allow more data to be transmitted. Therefore, the locator, such as an IP address, may be delivered in the scan response instead of the advertising packet. From the information included in an advertisement and/or requested additional information, the scanning device may know that a sensor is not directly connectable but should be connected via for example an IPv6 address.

Figure 5:
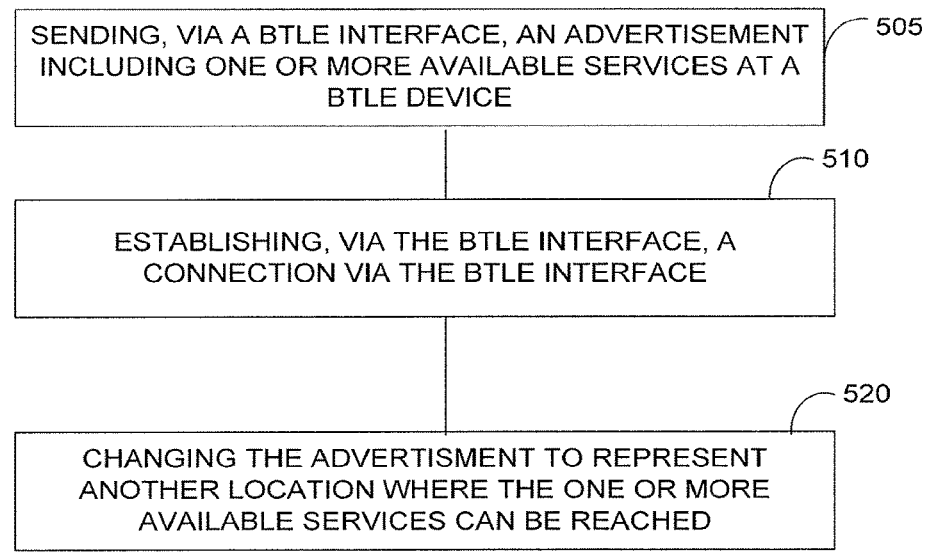
FIG. 5 depicts another example of a process for changing a locator in an advertisement, in accordance with some example embodiments.

FIG. 5 depicts another example process 500 for changing an advertised locator, in accordance with some example embodiments. The description of process 500 also refers to FIG. 1C.

In some example embodiments, an advertisement may be sent, at 505, by a BTLE device including a BTLE interface, and the advertisement may include one or more available services at the BTLE device. For example, a BTLE peripheral 192 having a BTLE radio interface may send/broadcast an advertisement including the availability of one or more services. In some example embodiments, the advertisement is sent via BTLE to other BTLE devices, and the advertisement may signal the availability of IPv6 service at the BTLE sensor 192 as well as other services.

In some example embodiments, a connection may be established, at 510, to one of the services. For example, another device, such as BTLE gateway 156, may couple directly via a BTLE interface to BTLE sensor 192, and this coupling may enable providing the IPv6 service.

When another device couples to a service at the BTLE device/sensor 192 at 510, the BTLE device 192 may change, at 520, the advertisement to include another locator representative of another location where the one or more available services can be reached. For example, BTLE device 192 may send a BTLE advertisement including a changed locator. This changed locator may correspond to an address of another device, such as gateway 156, address of a connection (for example, connection 158), and/or the address of any other device (for example, a remote server 204, a cache, and the like) capable of providing access or routing messages to/from BTLE sensor 192.

Figure 6:
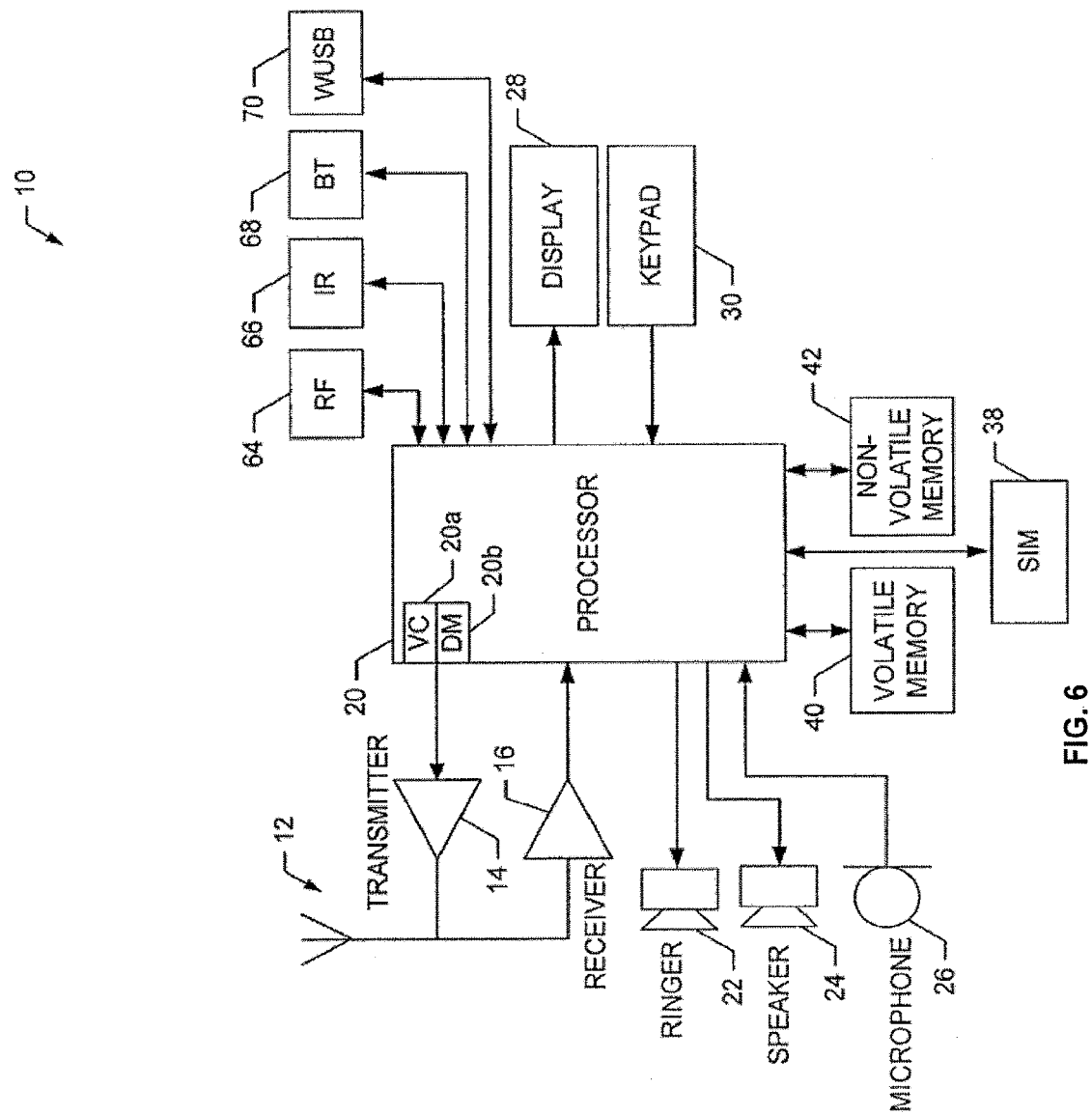
FIG. 6 depicts an example of a user equipment, in accordance with some example embodiments.

FIG. 6 illustrates a block diagram of an apparatus 10, in accordance with some example embodiments. For example, apparatus 10 may comprise a user equipment having a short-range wireless transceiver, such as Bluetooth, BTLE, and the like. As such, apparatus 10 may be used to provide the BTLE wireless devices disclosed herein. The user equipment may be implemented as a smart phone, mobile station, a mobile unit, a subscriber station, a wireless terminal, a tablet, a wireless plug-in accessory, or any other device with a short-range transceiver, such as Bluetooth, Bluetooth Low Energy, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95 Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy transceiver, a ZigBee transceiver, an ANT transceiver, a cellular device-to-device transceiver, a wireless local area link transceiver, and/or any other short-range radio technology. Moreover, in some example embodiments, the short-range transceiver may transmit advertisements (which may include the location change disclosed herein) generated by processor 20. Apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed herein with respect to the BTLE devices including for example sending advertisements, establishing connections via the BTLE devices, changing locators, and the like. The memories may comprise an identifier, such as an international mobile equipment identification (IMEI) code, capable of uniquely identifying apparatus 10. In the example embodiment, the processor 20 may be configured using computer code stored at memory 40 and/or 42 to operations disclosed herein with respect to process 100, 200, 500, and the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is that a Bluetooth sensor or peripheral having a single BTLE interface addressable with an IPv6 service may accessed by multitude of devices.

In some example embodiments, the BTLE device may be implemented as a sensor or peripheral with at least one memory (which may include computer program code), at least one processor, and a single radio interface, such as a BTLE interface.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. A method, comprising:
    sending, by a first wireless device including a short-range radio transceiver, information indicating an availability of one or more services at the first wireless device, wherein the information includes at least one location where a second wireless device can directly access the one or more services at the first wireless device;
    in response to establishing a direct connection between the short-range radio transceiver at the first wireless device and the second wireless device, changing the information to include at least one different location where a third wireless device can indirectly access the one or more indicated services at the first wireless device, wherein the at least one different location corresponds to an address where the first wireless device is reachable via an indirect connection between the first wireless device and the third wireless device, wherein the address includes at least one of an Internet Protocol address, an Internet Protocol version 4 address, an Internet Protocol version 6 address, a uniform resource locator, and a domain name, wherein communication between the first wireless device and the second wireless device are routed via the direct connection, and wherein communication between the first wireless device and the third wireless device are routed via the indirect connection; and
    sending the changed information including the at least one different location.

2. A method as in claims 1, wherein the address is associated with a remote server, a gateway, a connection, and/or a cache, and wherein the indirect connection between the first wireless device and the third wireless device is routed via the remote server, the gateway, the connection, and/or the cache.

3. A method as in claims 1, wherein the first wireless device comprises a sensor, and wherein the sensor includes the short-range radio transceiver.

4. A method as in claims 3, wherein the information and the changed information are broadcast via the short-range radio transceiver.

5. A method as in claims 1, wherein the short-range radio transceiver is configured in accordance with at least one of Bluetooth Low Energy and Bluetooth.

6. An apparatus, comprising:
    a short-range radio transceiver;
    at least one processor; and
    at least one memory including computer program code, the at least one memory and the computer program code configured to, with the at least one processor, cause the apparatus to at least:
    send information indicating an availability of one or more services at the apparatus, wherein the information includes at least one location where a first wireless device can directly access the one or more services at the apparatus;
    in response to establishing a direct connection between the short-range radio transceiver at the apparatus and the first wireless device, change the information to include at least one different location where a second wireless device can indirectly access the one or more indicated services at the apparatus, wherein the at least one different location corresponds to an address where the apparatus is reachable via an indirect connection between the apparatus and the second wireless device, wherein the address includes at least one of an Internet Protocol address, an Internet Protocol version 4 address, an Internet Protocol version 6 address, a uniform resource locator, and a domain name, wherein communication between the apparatus and the first wireless device are routed via the direct connection, and wherein communication between the apparatus and the second wireless device are routed via the indirect connection; and
    send the changed information including the at least one different location.

7. An apparatus as in claim 6, wherein the apparatus is further caused to at least establish the connection as an Internet Protocol version 6 connection or an Internet Protocol version 4 connection.

8. An apparatus as in claim 6, wherein the address is associated with a remote server, a gateway, a connection, and/or a cache, and wherein the indirect connection between the first wireless device and the third wireless device is routed via the remote server, the gateway, the connection, and/or the cache.

9. An apparatus as in claim 6, wherein the apparatus further comprises a sensor, and wherein the sensor includes the short-range radio transceiver.

10. An apparatus as in claim 9, wherein the information and the changed information are broadcast via the short-range radio transceiver.

11. An apparatus as in claim 6, wherein the short-range radio transceiver is configured in accordance with at least one of Bluetooth Low Energy and Bluetooth.

12. A non-transitory computer-readable storage medium including computer program code which when executed by at least one processor provides operations comprising:
    sending, by a first wireless device including a short-range radio transceiver, information indicating an availability of one or more services at the first wireless device, wherein the information includes at least one location where a second wireless device can directly access the one or more services at the first wireless device;

in response to establishing a direct connection between the short-range radio transceiver at the first wireless device and the second wireless device, changing the information to include at least one different location where a third wireless device can indirectly access the one or more indicated services at the first wireless device, wherein the at least one different location corresponds to an address where the first wireless device is reachable via an indirect connection between the first wireless device and the third wireless device, wherein the address includes at least one of an Internet Protocol address, an Internet Protocol version 4 address, an Internet Protocol version 6 address, a uniform resource locator, and a domain name, wherein communication between the first wireless device and the second wireless device are routed via the direct connection, and wherein communication between the first wireless device and the third wireless device are routed via the indirect connection; and sending the changed information including the at least one different location.

13. An apparatus, comprising:

means for sending information indicating an availability of one or more services at the apparatus, wherein the information includes at least one location where a first wireless device can directly access the one or more services at the apparatus;

means for changing the information, the changing being in response to establishing a direct connection between a short-range radio transceiver at the apparatus and the first wireless device, the information being changed to include at least one different location where a second wireless device can indirectly access the one or more indicated services at the apparatus, wherein the at least one different location corresponds to an address where the apparatus is reachable via an indirect connection between the apparatus and the second wireless device, wherein the address includes at least one of an Internet Protocol address, an Internet Protocol version 4 address, an Internet Protocol version 6 address, a uniform resource locator, and a domain name, wherein communication between the apparatus and the first wireless device are routed via the direct connection, and wherein communication between the apparatus and the second wireless device are routed via the indirect connection; and means for sending the changed information including the at least one different location.

* * * * *